United States Patent [19]

Sakurai et al.

[11] Patent Number: 4,700,669
[45] Date of Patent: Oct. 20, 1987

[54] INTAKE DEVICE OF AN INTERNAL COMBUSTION ENGINE

[75] Inventors: Kazuhiro Sakurai, Gotenba; Kyo Hattori, Toyota, both of Japan

[73] Assignee: Toyota Jidosha Kabushiki Kaisha, Toyota, Japan

[21] Appl. No.: 810,786

[22] Filed: Dec. 19, 1985

[30] Foreign Application Priority Data

Dec. 20, 1984 [JP] Japan .......................... 59-192107[U]

[51] Int. Cl.$^4$ .......................... F02F 1/42; F02B 31/00
[52] U.S. Cl. .................................. 123/188 M; 123/308
[58] Field of Search ............... 123/188 M, 306, 308, 123/52 M

[56] References Cited

U.S. PATENT DOCUMENTS

| | | | |
|---|---|---|---|
| 4,485,773 | 12/1984 | Kanda et al. | 123/188 M |
| 4,503,819 | 3/1985 | Okumura et al. | 123/188 M |
| 4,527,519 | 7/1985 | Oonaka et al. | 123/188 M |

FOREIGN PATENT DOCUMENTS

| | | | |
|---|---|---|---|
| 58-12841 | 8/1983 | Japan . | |
| 195016 | 11/1983 | Japan | 123/188 M |

*Primary Examiner*—Ira S. Lazarus
*Attorney, Agent, or Firm*—Finnegan, Henderson, Farabow, Garrett & Dunner

[57] ABSTRACT

An engine having a rotary valve arranged in the intake port. The valve shaft of the rotary valve is eccentrically arranged relative to the longitudinal axis of the intake port. A projecting wall projects downward from the upper wall of the intake port and surrounds the valve guide of the intake valve. The projecting wall has an air flow guide portion the thickness and width of which gradually decreases in the direction towards the rotary valve. The upstream end of the air flow guide portion is aligned with the valve plate of the rotary valve when the rotary valve is fully open.

12 Claims, 3 Drawing Figures

INTAKE DEVICE OF AN INTERNAL COMBUSTION ENGINE

BACKGROUND OF THE INVENTION

1. Field of the Invention

The present invention relates to an intake device of an internal combustion engine.

2. Description of the Related Art

In a known engine, a rotary valve arranged in the intake port of the engine has a valve shaft eccentrically arranged relative to the axis of the intake port, to create an eccentric air flow in the intake port (Japanese Unexamined Patent Publication (Kokai) No. 58-128418).

When this engine is operating under a light load, the rotary valve is closed. At this time, an air-fuel mixture is caused to flow along one of the inner side walls of the intake port and then flow into the combustion chamber toward the circumferential direction of the combustion chamber. As a result, a strong swirl motion is created in the combustion chamber. Conversely, when the engine is operating under a heavy load, the rotary valve is rotated to the fully open position at which the valve plate of the rotary valve extends substantially in parallel to the axis of the intake port, and since the flow area of the intake port is then at its maximum, the volumetric efficiency increases.

In this engine, the valve guide for the intake valve projects downward from the upper wall of the intake port. However, where the valve guide projects into the intake port, this valve guide creates a large flow resistance to the air flow. Consequently, in this engine, a wall projecting downward from the upper wall of the intake port and surrounding the valve guide is formed on the upper wall of the intake port. This projecting wall has an air flow guide portion having a width which gradually decreases towards the upstream of the intake port. The air-fuel mixture is guided by the air flow guide portion, and thus the flow resistance is reduced.

However, in this engine, when the rotary valve is fully open, the upstream end of the air flow guide portion is not aligned with the valve plate of the rotary valve. Consequently, the air-fuel mixture stream is initially divided into two streams by the rotary valve, and then further divided into two streams by the upstream end of the air flow guide portion. As mentioned above, in this engine, when the rotary valve is fully open, since the dividing of the air-fuel mixture stream is carried out twice, the flow resistance is still large and, therefore, a problem occurs in that a satisfactorily high volumetric efficiency cannot be obtained.

SUMMARY OF THE INVENTION

An object of the present invention is to provide an intake device for an engine, which device is capable of obtaining a high volumetric efficiency when the rotary valve is fully open.

Additional objects and advantages of the invention will be set forth in the description which follows and in part will be obvious from the description, or may be learned by practice or the invention. The objects and advantages of the invention and may be realized and attained by means of the instrumentalities and combinations particulaly pointed out in the appended claims.

To achieve the objects and in accordance with the purpose of the invention, as embodied and broadly described herein, there is provided an intake device for an internal combustion engine having an intake port, an intake valve, and a valve guide projecting downwardly from the upper wall of the intake port, and comprising a rotary valve mounted for rotation in the intake port and having a substantially vertically extending valve shaft, the valve shaft being offset relative to the longitudinal axis of the intake port, the rotary valve having a valve plate positioned in the intake port, an actuator connected to the valve shaft for rotating the rotary valve from a closed position to a fully opened position in which the valve plate extends substantially in parallel to the axis of the intake port, and a projecting wall projecting downwardly from the upper wall of the intake port and having an air-flow-guiding portion which extends from the valve guide towards the rotary valve, the air-flow-guiding portion having its width gradually decreasing in a direction toward the rotary valve and terminating in an end which is positioned downstream of the valve plate and which is aligned with the valve plate and adjacent to its downstream end when the rotary valve is in the fully opened position.

The present invention may be more fully understood from the description of a preferred embodiment of the invention set forth below, together with the accompanying drawings.

DESCRIPTION OF A PREFERRED EMBODIMENT

Figure 1:
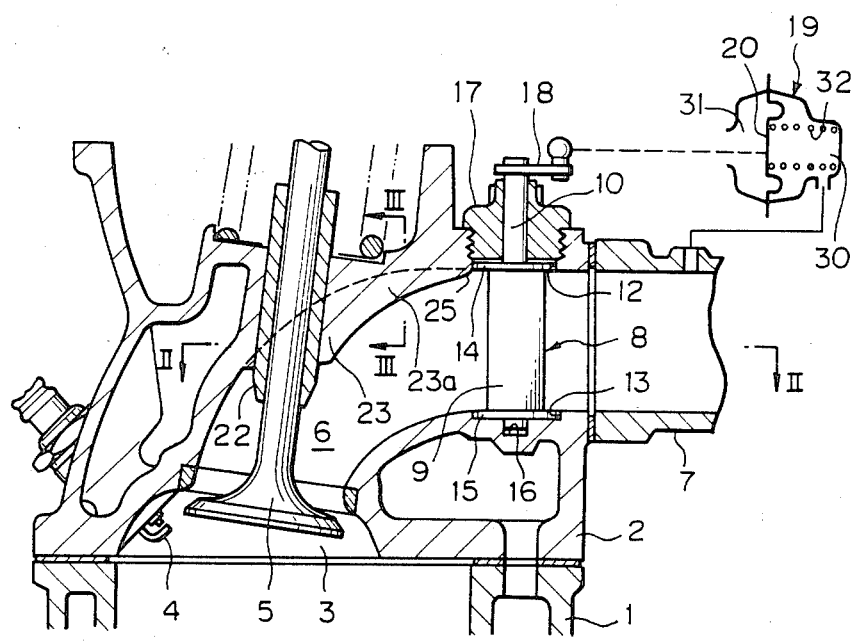
FIG. 1 is a cross-sectional side view of an engine constructed in accordance with to the present invention.
Figure 2:
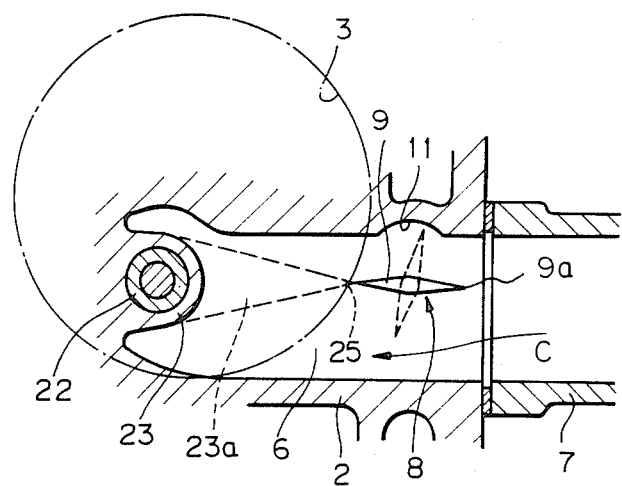
FIG. 2 is a cross-sectional plan view of the engine, taken along the line II—II in FIG. 1.

Referring to FIGS. 1 and 2, reference numeral 1 designates a cylinder block, 2 a cylinder head, 3 a combustion chamber, and 4 a spark plug; 5 designates an intake valve, 6 an intake port, 7 an intake manifold, and 8 a rotary valve for creating an eccentrical air flow. The rotary valve 8 comprises a valve plate 9 having a substantially rectangular shape, and a valve shaft 10. The shape of the valve plate 9 is symmetrical relative to the axis of the valve shaft 10. As illustrated in FIG. 1, the valve plate 9 extends over the entire height of the intake port 6 and, as illustrated in FIG. 2, the valve body 9 has a width which is smaller than the transverse width of the intake port 6. The rotating axis of the valve shaft 10 extends vertically across the intake port 6 at a position eccentric to the longitudinal axis of the intake port 6. A vertically extending groove 11 having an arc-shaped cross-section is formed on the inner side wall of the intake port 6, which is located on the eccentric side of the valve shaft 10. One of the peripheral edges 9a of the valve plate 9, which extends in parallel to the rotating axis of the valve shaft 10, moves along the cylindrical face of the groove 11 when the rotary valve 8 is rotated. The groove 11 extends over the entire height of the intake port 6.

A partly threaded cylindrical bore 12 is formed on the upper wall of the intake port 6, and a cylindrical bore 13 is formed on the bottom wall of the intake port 6. These cylindrical bores 12 and 13 are arranged coaxially with a cylinder forming the cylindrical face of the groove 11 and have the same diameter as that cylinder.

A circular flange 14 located within the cylinder bore 12 is integrally formed on the upper end portion of the valve plate 9, and another circular flange 15 located within the cylindrical bore 13 is integrally formed on the lower end portion of the valve plate 9. The inner walls of the circular flanges 14 and 15 are arranged in planes which are the same as the planes in which the upper wall and the lower wall of the intake port 6 are located, respectively, to reduce the flow resistance. The lower end of the valve shaft 10 is rotatably fitted into a small diameter bore 16 formed in the cylindrical bore 13, and the upper portion of the valve shaft 10 is rotatably supported by a plug 17 screwed into the cylindrical bore 12. The upper end of the valve shaft 10 projects upward from the plug 17, and an arm 18 is connected to the projecting upper end of the valve shaft 10. The tip of the arm 18 is connected to a diaphragm 20 of an actuator 19. This actuator 19 comprises a vacuum chamber 30 and an atmospheric pressure chamber 31, which are separated by the diaphragm 20. A compression spring 32 for biasing the diaphragm 20 is arranged in the vacuum chamber 30, and the vacuum chamber 30 is connected to the interior of the intake manifold 7.

When a large vacuum is produced in the intake manifold 7, that is, when the engine is operating under a light load, the diaphragm 20 moves to the right as seen in FIG. 1. At this time, the valve plate 9 is rotated to the closed position in which the valve plate 9 closes a portion of the intake port 6, as illustrated by the broken line in FIG. 2. When the level of vacuum produced in the intake manifold 7 is small, that is, when the engine is operating under a heavy load, the diaphragm 20 moves to the left as seen in FIG. 1. As a result, the rotary valve 8 is rotated to the fully open position as illustrated by the solid line in FIG. 2. At this time, the width of the valve plate 9 is parallel to the axis of the intake port 6.

Figure 3:
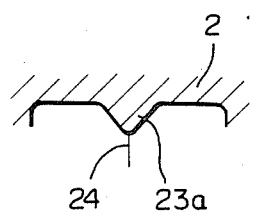
FIG. 3 is a cross-sectional view of the engine, taken along the line III—III in FIG. 1.

As illustrated in FIG. 1, a valve guide 22 for guiding the valve stem of the intake valve 5 projects downward from the upper wall of the intake port 6 and a projecting wall 23 surrounding the valve guide 22 also projects downward from the upper wall of the intake port 6. As illustrated in FIG. 2, the projecting wall 23 extends around the valve guide 22 along the periphery thereof. In addition, as illustrated in FIGS. 1 through 3, the projecting wall 23 has an air flow guide portion 23a extending toward the rotary valve 8. This air flow guide portion 23a is constructed in such a manner that the thickness thereof gradually becomes lesser in the direction toward the rotary valve 8, as illustrated in FIG. 1, and that the width of the air flow guide portion 23a gradually becomes narrower in the direction toward the rotary valve 8, as illustrated by the broken line in FIG. 2. The air flow guide portion 23a has an approximately triangular cross-section as illustrated in FIG. 3, and the lower tip edge 24 of the air flow guide portion 23a extends substantially parallel to the axis of the intake port 6. The upstream end 25 of the air flow guide portion 23a is arranged so that it is located adjacent to and aligned with the downstream end of the valve plate 9 when the rotary valve 8 is fully open.

As mentioned above, when the engine is operating under a light load, the valve plate 9 of the rotary valve 8 closes a portion of the intake port 6 as illustrated by the broken line in FIG. 2. Consequently, at this time, air is caused to flow along one of the inner side walls of the intake port 6, as illustrated by the arrow C in FIG. 2, and then into the combustion chamber 3 along the circumferential wall thereof. As a result, a strong swirl motion is created in the combustion chamber 3.

When the engine is operating under a heavy load, the rotary valve 8 is rotated to the fully open position in which the valve plate 9 is placed in parallel to the axis of the intake port 6 as illustrated by the solid line in FIG. 2. At this time, the downstream end of the valve plate 9 is aligned with the upstream end 25 of the air flow guide portion 23a on a line parallel to the axis of the intake port 6. Consequently, the air stream is divided into two streams by the upstream end of the valve plate 9 and each thusdivided air stream is then guided by the air flow guide portion 23a without being further divided. Each of these air streams then flows into the combustion chamber 3. As a result, the flow resistance becomes small and a high volumetric efficiency can be obtained.

As mentioned above, according to the present invention, when the engine is operating under a heavy load, each of the air streams divided by the upstream end 9a of the valve plate 9 is guided by the air flow guide portion 23a of the projecting wall 23 without being further divided. The air then flows into the combustion chamber 3. Consequently, the flow resistance becomes small, and thus it is possible to obtain a high volumetric efficiency.

While the invention has been described by reference to a specific embodiment chosen for purposes of illustration, it should be apparent that numerous modifications could be made thereto by those skilled in the art without departing from the basic concept and scope of the invention.

We claim:

1. An intake device for an internal combustion engine having an intake port, an intake valve and a valve guide projecting downwardly from the upper wall of the intake port, said device comprising:
   a rotary valve mounted for rotation in said intake port and having a substantially vertically extending valve shaft, said valve shaft being offset relative to the longitudinal axis of said intake port, said rotary valve having a valve plate positioned in said intake port;
   an actuator connected to said valve shaft for rotating said rotary valve from a closed position to a fully opened position in which said valve plate extends substantially parallel to the axis of said intake port; and
   a projecting wall projecting downwardly from the upper wall of said intake port and having an airflow-guiding portion which extends from said valve guide towards said rotary valve, said airflow-guiding portion having its width gradually decreasing in a direction toward said rotary valve and terminating in an end which is positioned downstream of said valve plate and which is aligned with said valve plate and adjacent to the downstream end of said valve plate when said rotary valve is in said fully opened position.

2. An intake device according to claim 1, wherein said valve plate has a substantially rectangular shape in elevation and is symmetrical with respect to the axis of said valve shaft.

3. An intake device according to claim 2, wherein said valve plate has a peripheral edge extending parallel to the axis of said valve shaft, said intake port having a side wall with a groove formed thereon, said groove having a cylindrical face along which the peripheral edge of said valve plate moves.

4. An intake device according to claim 1, wherein cylindrical bores are formed on the upper wall of said intake port and the bottom wall of said intake port, respectively, said rotary valve having circular flanges which are integrally formed on the upper end portion and lower end portion of said valve plate and positioned in said cylindrical bores, respectively.

5. An intake device according to claim 4, wherein the inner surfaces of said cylindrical flanges are located in planes which are the same planes in which the upper wall and the lower wall of said intake port are respectively located.

6. An intake device according to claim 1, wherein said air-flow-guiding portion has a substantially triangular cross-section and a lower edge.

7. An intake device according to claim 6, wherein the lower edge of said air-flow-guiding portion is aligned with said valve plate when said rotary valve is in said fully opened position.

8. An intake device according to claim 1, wherein said air-flow-guiding portion has a thickness which gradually decreases in a direction toward said rotary valve.

9. An intake device according to claim 1, wherein said rotary valve partially closes said intake port when said rotary valve is in said closed position.

10. An intake device according to claim 1, wherein said actuator actuates said rotary valve in response to engine load to maintain said rotary valve at said closed position when the engine load is lower than a predetermined load and to maintain said rotary valve at said fully opened position when the engine load exceeds said predetermined load.

11. An intake device according to claim 10, wherein said actuator comprises a diaphragm connected to said valve shaft, and a vacuum chamber isolated from the outside air by said diaphragm and designed to be connected to an intake manifold.

12. An intake device for controlling the intake flow of the air-fuel mixture stream in an internal combustion engine having an intake port, an intake valve and a valve guide for said intake valve, said device comprising:

a rotary valve mounted for rotation in said intake port and having a valve plate positioned in said intake port, and means for rotating said rotary valve and thereby said valve plate between a first position, where said valve plate is transverse to said intake flow and closes a portion of the intake port, and a second position, where said valve plate is aligned in the direction of intake flow and divides the air-fuel mixture stream into two streams;

a wall projecting downwardly into the intake port and having an air-flow-guiding portion which extends from said valve guide towards said rotary valve, said air-flow-guiding portion having its width decreasing in a direction towards said rotary valve and terminating in an end positioned downstream of said valve plate;

said end of said air-flow-guiding portion being aligned with said valve plate and adjacent to the downstream end of said valve plate when said rotary valve is in said second position so as not to divide further the two streams of air-fuel mixture, whereby a high volumetric efficiency is obtained.

* * * * *